(12) United States Patent
Cottrell

(10) Patent No.: US 9,122,017 B2
(45) Date of Patent: Sep. 1, 2015

(54) OPTICAL INTERCONNECT FOR ROLLING SLIP RINGS

(71) Applicant: RAYTHEON COMPANY, Waltham, MA (US)

(72) Inventor: William J. Cottrell, Somerville, MA (US)

(73) Assignee: RAYTHEON COMPANY, Waltham, MA (US)

(*) Notice: Subject to any disclaimer, the term of this patent is extended or adjusted under 35 U.S.C. 154(b) by 302 days.

(21) Appl. No.: 13/896,221

(22) Filed: May 16, 2013

(65) Prior Publication Data

US 2014/0341505 A1    Nov. 20, 2014

(51) Int. Cl.
*G02B 6/36* (2006.01)

(52) U.S. Cl.
CPC .................................. *G02B 6/3604* (2013.01)

(58) Field of Classification Search
CPC ............................ G02B 6/3604; G02B 6/3504
See application file for complete search history.

(56) References Cited

U.S. PATENT DOCUMENTS

| | | | |
|---|---|---|---|
| 4,277,134 A | 7/1981 | Upton, Jr. | |
| 4,444,459 A * | 4/1984 | Woodwell | 385/26 |
| 4,525,025 A | 6/1985 | Hohmann et al. | |
| 4,580,871 A | 4/1986 | Matsunaga et al. | |
| 4,711,516 A * | 12/1987 | Graber | 385/26 |
| 4,898,447 A | 2/1990 | Kuhlmann | |
| 4,900,117 A | 2/1990 | Chen | |
| 4,958,904 A | 9/1990 | Rawski | |
| 4,998,103 A | 3/1991 | Rosswurm et al. | |
| 5,033,813 A | 7/1991 | Westfall | |
| 5,261,757 A | 11/1993 | Elliott, Jr. et al. | |
| 5,287,423 A | 2/1994 | Anthony | |
| 5,422,969 A | 6/1995 | Eno | |
| 5,450,509 A | 9/1995 | Davis | |
| 5,666,448 A | 9/1997 | Schoenwald et al. | |
| 5,757,994 A | 5/1998 | Schoenwald et al. | |
| 5,949,929 A | 9/1999 | Hamm | |
| 5,991,478 A | 11/1999 | Lewis et al. | |
| 6,104,849 A | 8/2000 | Lewis et al. | |
| 6,246,810 B1 | 6/2001 | Harris et al. | |
| 6,453,088 B1 * | 9/2002 | Lewis et al. | 385/25 |
| 6,898,346 B2 | 5/2005 | Mercey et al. | |
| 6,907,161 B2 | 6/2005 | Bowman | |
| 6,980,714 B2 | 12/2005 | Lo et al. | |
| 6,996,300 B2 | 2/2006 | Schilling | |
| 7,010,191 B2 | 3/2006 | Poisel et al. | |
| 7,149,382 B2 | 12/2006 | Schilling et al. | |
| 7,194,154 B2 | 3/2007 | Hyatt | |
| 7,248,761 B2 | 7/2007 | Schilling et al. | |
| 7,376,298 B2 | 5/2008 | Schilling | |
| 7,539,372 B2 | 5/2009 | Koitabashi | |
| 7,599,467 B2 | 10/2009 | Popescu | |
| 7,629,600 B2 | 12/2009 | Denk et al. | |
| 2012/0213472 A1 | 8/2012 | Violante et al. | |
| 2012/0237198 A1 | 9/2012 | Bowman | |

* cited by examiner

*Primary Examiner* — Michelle R Connelly
(74) *Attorney, Agent, or Firm* — Lando & Anastasi, LLP

(57) ABSTRACT

A rolling slip ring structure is disclosed incorporating coupled optical waveguides that provide an optical signal pathway through at least three coplanar optical waveguide rings. The inner, outer and center rings of the rolling slip ring structure are configured such that any or all of the rings can rotate about a central axis perpendicular to the plane of the rings and at the center of the inner and outer optical waveguide rings. The center optical waveguide ring can also rotate about an axis that is perpendicular to the plane containing the three optical waveguide rings and is at the center of the center ring. The optical coupling length between the optical waveguide rings in the system remains constant regardless of rotation of any or all of the optical waveguide rings.

22 Claims, 14 Drawing Sheets

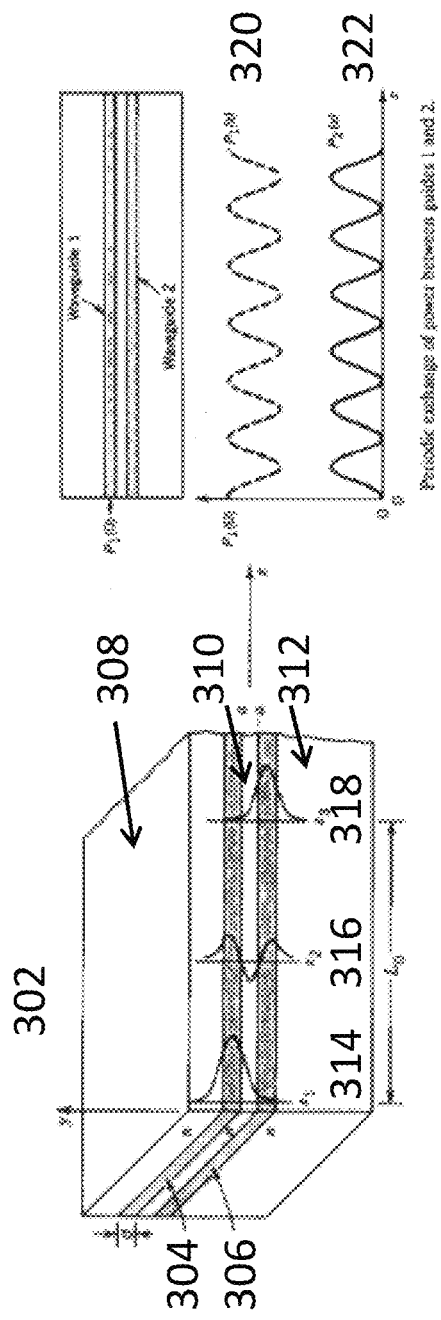
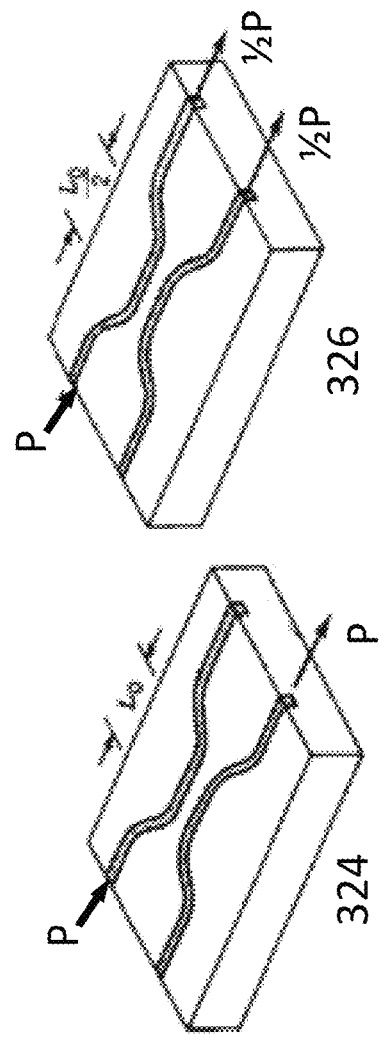
FIG. 3A
FIG. 3B

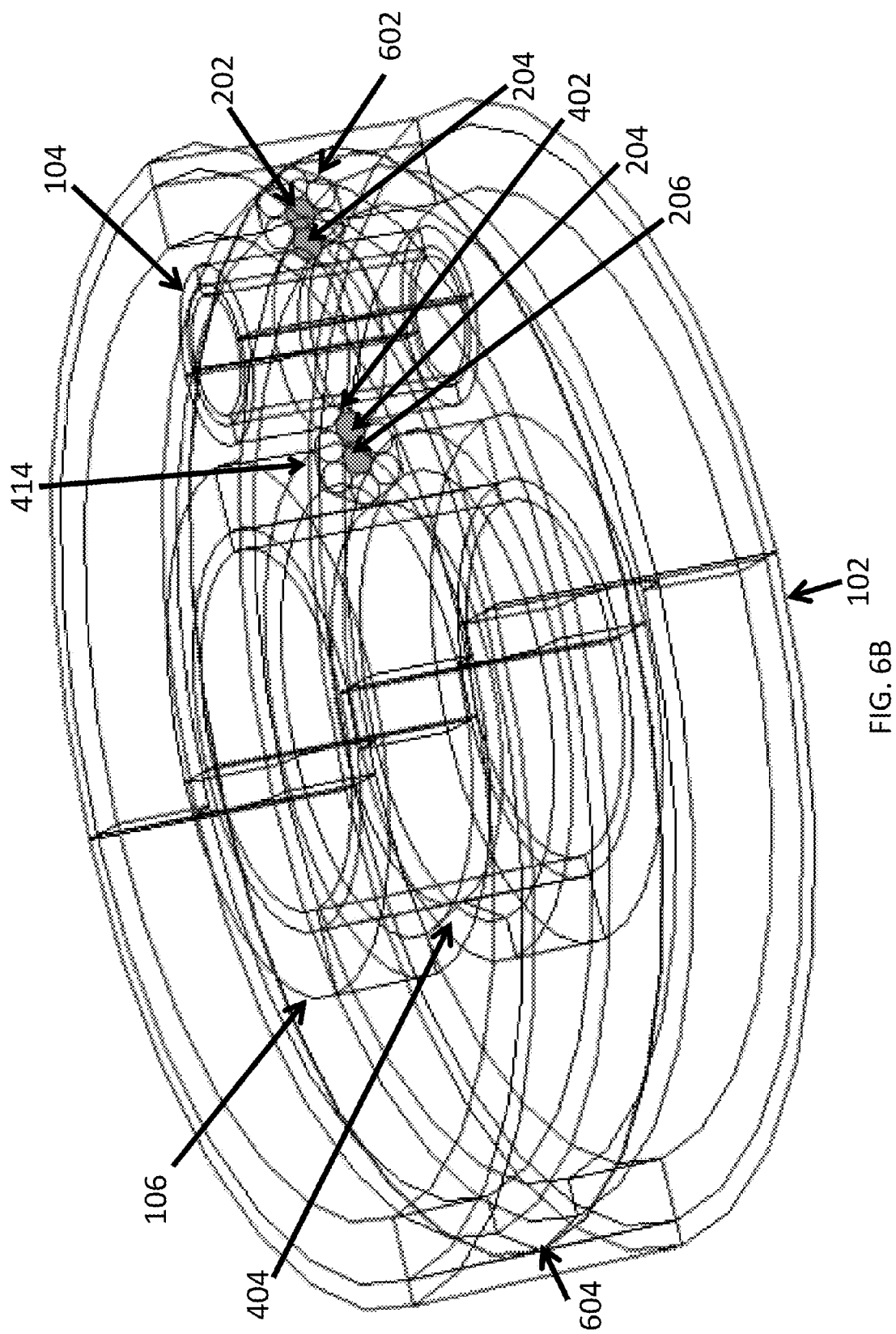

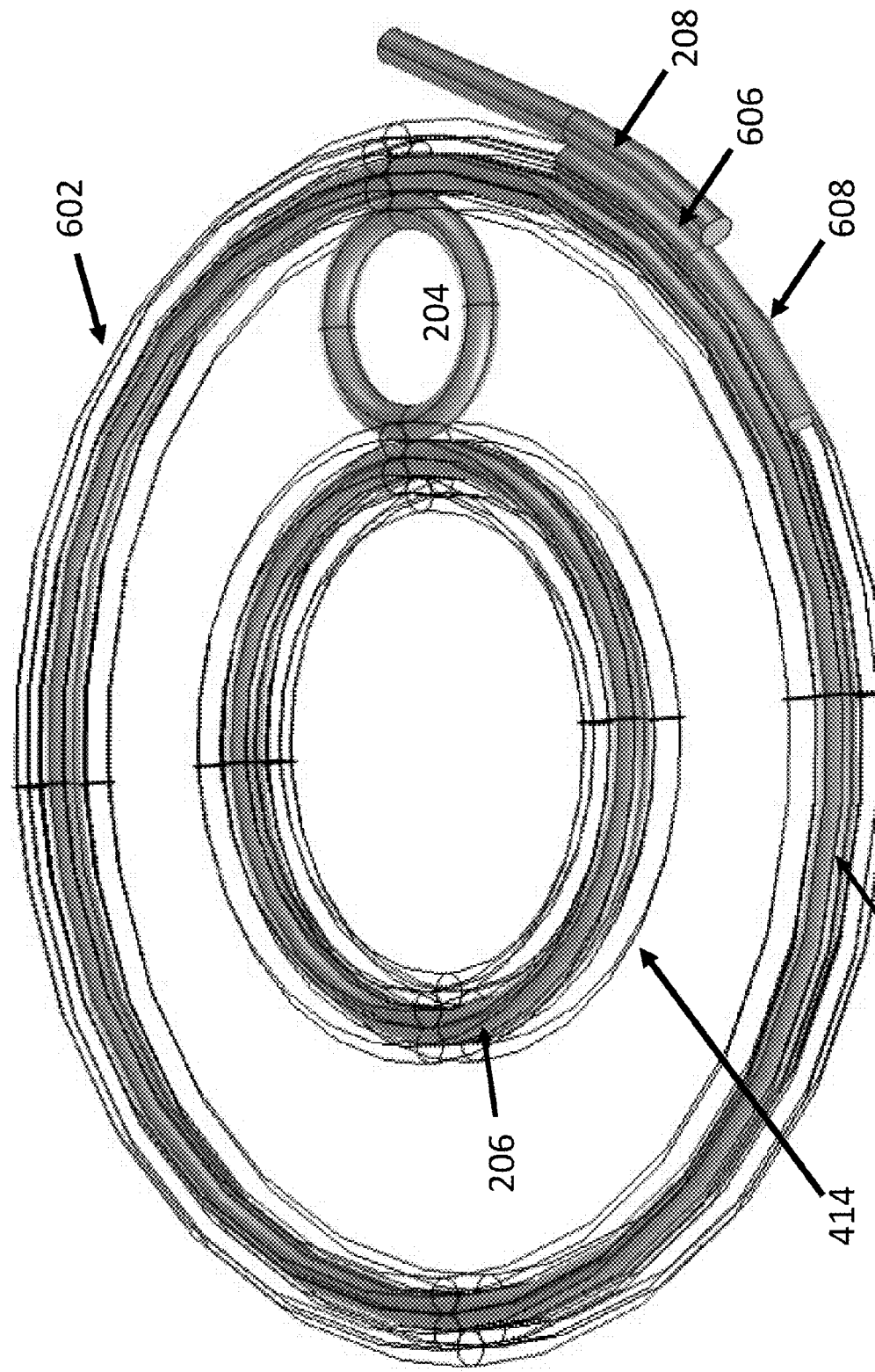

OPTICAL INTERCONNECT FOR ROLLING SLIP RINGS

BACKGROUND

Slip rings are electromechanical structures that are commonly used for passing electrical signals between the interior and exterior components of rotating cylindrical structures sharing a common axis of rotation. Slip rings can be used to transmit power and data between a stationary component and a rotating component, where one or both of the interior or exterior cylindrical structures may rotate. Electrical connection between the interior and exterior cylindrical structures is often accomplished through the use of metallic brush fibers that provide the physical contact necessary for an electrical current to pass between the cylindrical structures.

Referring to FIG. 1, physical connectivity between exterior and interior cylindrical structures has also been accomplished through the use of rolling slip ring structures. In a rolling slip ring structure 100, mechanical and electrical connectivity between an outer ring 102 and an inner ring 106 is obtained through the use of a center ring 104. When either or both of the outer ring 102 and inner ring 106 are rotating, the center ring 104 provides a low friction structure for maintaining physical connectivity between the outer ring 102 and inner ring 106. When the outer ring 102, center ring 104, and inner fiber 106 are all fashioned from electrically conductive materials, electrical signals can propagate through the three possibly rotating rings, transferring power and data through the entire slip ring structure. Rolling slip rings can provide a low friction, low torque mechanism for maintaining physical connectivity between potentially rotating interior and exterior components. Due to the small friction present between the various components, rolling slip rings can have a longer mechanical life compared to slip rings incorporating metallic fiber brush connections between interior and exterior components. The modular nature of the rings in such rolling slip ring architecture can also provide for easier maintenance of components compared to slip rings incorporating integrated metallic fiber brush connections.

The speed at which data is transferred through such a rolling slip ring architecture 100 is limited by the speed at which data can be transmitted through the electrically conductive pathway of the center ring's 104 interior and exterior contact points with the inner 106 and outer 102 rings. Typically, maximum data rates achieved through electrical connections in such a rolling slip ring architectures are on the order of tens to hundreds of Mb/sec.

SUMMARY OF INVENTION

Aspects and embodiments of this disclosure are directed to rolling slip ring structures that provide higher rates of data connectivity through the use of integrated optical waveguides. For example, according to aspects and embodiments, optical fiber loops are incorporated within rolling slip ring structures so as to provide pathways for optical signals that have higher data rates, and that provide for rotation by components of the structure.

According to some embodiments, a fully rotational conductor assembly comprises an inner optical signal conductor and an outer optical signal conductor having complementary tracks, with at least one of the inner optical signal conductor and the outer optical signal conductor being relatively rotatable about a common axis. A center optical signal conductor is located between and engages the complementary tracks, thereby providing optical signal coupling between the inner and outer optical signal conductors. An input optical signal conductor is optically coupled to the outer optical signal conductor so as to couple optical signals from the input optical signal conductor to the output optical signal conductor. An output optical signal conductor is optically coupled to the inner optical signal conductor so as to couple optical signals from the inner optical signal conductor to the output optical signal conductor.

According to aspects of some embodiments, the inner optical signal conductor comprises an inner fiber optic ring, the outer optical signal conductor comprises an outer fiber optic ring, and the center optical signal conductor comprises a fiber optic ring. The inner fiber optic ring may be disposed in a v-groove of an inner mounting, the outer fiber optic ring may be disposed in a v-groove of an outer mounting, and the center fiber optic ring may be disposed in a v-groove of a center mounting. In some embodiments, the v-groove associated with the inner ring is etched into a dielectric material layer of the inner mounting, the v-groove associated with the outer ring is etched into a dielectric material layer of the outer mounting, and the v-groove associated with the center ring is etched into a dielectric material layer of the center mounting.

In some embodiments, the inner fiber optic ring is disposed in a hexagonal array of optically non-mode matched fibers and the outer fiber optic ring is disposed in a hexagonal array of optically non-mode matched fibers. In some embodiments, the inner optical signal conductor comprises a dielectric waveguide with a rectangular cross-section, the outer optical signal conductor comprises a dielectric waveguide with a rectangular cross-section, and the center optical signal conductor comprises a dielectric waveguide with a rectangular cross-section. In some embodiments, the inner optical signal conductor comprises a surface plasmon waveguide, the outer optical signal conductor comprises a surface plasmon waveguide, and the center optical signal conductor comprises a surface plasmon waveguide.

In some embodiments, the any of outer mounting, the center mounting, and the inner mounting of the respective outer, center and inner optical signal conductors have a circular ring shape. In other embodiments, any of the outer mounting, the center mounting, and the inner mounting of the respective outer, center and inner optical signal conductors have an elliptical ring shape. In some embodiments, the center optical signal conductor is not mounted on a separate mounting, but rather the center fiber optic ring provides its own mechanical support.

According to aspects of some embodiments, either or both of the inner hexagonal array of fibers associated with the inner fiber optic ring can be immersed in a refractive index matching fluid and the outer hexagonal array of fibers associated with the outer fiber optic ring can be immersed in a refractive index matching fluid.

According to aspects of some embodiments, the center optical signal conductor provides optical signal coupling between the inner optical signal conductor and the outer optical signal conductor via evanescent wave coupling.

According to aspects of some embodiments, the inner optical signal conductor contains an optically absorbing material, the center optical signal conductor contains an optically absorbing material, and the outer optical signal conductor contains an optically absorbing material.

According to some embodiments, a method of propagating an optical signal through a fully-rotational conductor assembly including an outer optical waveguide ring, a center optical waveguide ring, and an inner optical waveguide ring comprises propagating an input optical signal along an exterior optical waveguide, coupling the optical signal from the input optical waveguide to an outer optical waveguide ring, propagating the optical signal along the outer optical waveguide ring, coupling the optical signal from the outer optical waveguide ring to a center optical waveguide ring, propagating the optical signal along the center optical waveguide ring, coupling the optical signal from the center optical waveguide ring to an inner optical waveguide ring, propagating the optical signal along the inner optical waveguide ring, and coupling the optical signal from the inner optical waveguide ring to an interior optical waveguide.

According to some embodiments, a method of propagating an optical signal through a fully-rotational conductor assembly including an outer optical waveguide ring, a center optical waveguide ring, and an inner optical waveguide ring comprises propagating an input optical signal along an interior optical waveguide, coupling the optical signal from the interior optical waveguide to an inner optical waveguide ring, propagating the optical signal along the inner optical waveguide ring, coupling the optical signal from the inner optical waveguide ring to a center optical waveguide ring, propagating the optical signal along the center optical waveguide ring, coupling the optical signal from the center optical waveguide ring to an outer optical waveguide ring, propagating the optical signal along the outer optical waveguide ring, and coupling the optical signal from the outer optical waveguide ring to an outer optical waveguide.

According to some embodiments, a method of propagating an optical signal through a fully-rotational conductor assembly including an outer optical waveguide ring, a center optical waveguide ring, and an inner optical waveguide ring comprises propagating an input optical signal along an input optical waveguide, coupling the optical signal from the input optical waveguide to one of the outer optical waveguide ring and the inner optical waveguide ring, propagating the optical signal along the one of the outer optical waveguide ring and the inner optical waveguide ring, coupling the optical signal from the one of the outer optical waveguide ring and the inner optical waveguide ring to a center optical waveguide ring, propagating the optical signal along the center optical waveguide ring, coupling the optical signal from the center optical waveguide ring to one of the outer optical waveguide ring and the inner optical waveguide ring, propagating the optical signal along the one of the outer optical waveguide ring and the inner optical waveguide ring, and coupling the optical signal from the one of the outer optical waveguide ring and the inner optical waveguide ring to an output optical waveguide.

According to aspects of this embodiment, the method of propagating an optical signal through the fully rotational conductor assembly comprises propagating optical signals from both the outer optical waveguide ring to the inner optical waveguide ring and from the inner optical waveguide ring to the outer optical waveguide ring as counter propagating waveguides propagating counter optical signals. According to aspects of this embodiment the counter propagating optical signals can be propagated either alternatively or simultaneously.

According to aspects of some embodiments, the method of propagating an optical signal through the fully rotational conductor assembly comprises any or all of partially scattering light out of a primary mode of the inner optical waveguide ring with an etched cladding layer, partially scattering light out of a primary mode of the outer optical waveguide ring with an etched cladding layer, and partially scattering light out of a primary mode of the center optical waveguide ring with an etched cladding layer.

According to aspects of some embodiments, the method of propagating an optical signal through the fully rotational conductor assembly comprises any or all of partially scattering light out of a primary mode of the inner optical waveguide ring with a lossy optical splicing between two ends of the inner optical waveguide ring, partially scattering light out of a primary mode of the outer optical waveguide ring with a lossy optical splicing between two ends of the outer optical waveguide ring, and partially scattering light out of a primary mode of the center optical waveguide ring with a lossy optical splicing between two ends of the center optical waveguide ring.

According to aspects of some embodiments, the method of propagating an optical signal through the fully rotational conductor assembly comprises any or all of partially scattering light out of a primary mode of the inner optical waveguide ring with a tilted volume Bragg grating within the core of the inner optical waveguide ring, partially scattering light out of a primary mode of the outer optical waveguide ring with a tilted volume Bragg grating within the core of the outer optical waveguide ring, and partially scattering light out of a primary mode of the center optical waveguide ring with a tilted volume Bragg grating within the core of the center optical waveguide ring.

According to aspects of some embodiments, the method of propagating an optical signal through the fully rotational conductor assembly comprises any or all of partially scattering light out of a primary mode of the inner optical waveguide ring with either mechanical stress or strain placed on the inner optical waveguide ring, partially scattering light out of a primary mode of the outer optical waveguide ring with either mechanical stress or strain placed on the outer optical waveguide ring, and partially scattering light out of a primary mode of the center optical waveguide ring with either mechanical stress or strain placed on the center optical waveguide ring.

According to aspects of some embodiments, the method of propagating an optical signal through the fully rotational conductor assembly comprises any or all of partially scattering light out of a primary mode of the inner optical waveguide ring with optical absorption within the inner optical waveguide ring, partially scattering light out of a primary mode of the outer optical waveguide ring with optical absorption within the outer optical waveguide ring, and partially scattering light out of a primary mode of the center optical waveguide ring with optical absorption within the center optical waveguide ring.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3A is a diagram illustrating the coupling of optical modes between waveguides in an optical directional coupler;

FIG. 3B is a schematic diagram illustrating the dependence of optical coupling efficiency on coupling optical coupling path length;

FIG. 6B is schematic diagram of a hexagonal fiber optic array mounted within V-grooves etched into the rings of a rolling slip ring structure, according to aspects of this disclosure;

FIG. 6C is a schematic diagram of the fiber rings in a rolling slip ring structure showing inner and outer hexagonal fiber array mountings, an optically mode-matched segment of optical fiber spliced to a non-guiding segment within the outermost fiber of the outer hexagonal array, and an input signal fiber, according to aspects of this disclosure;

DETAILED DESCRIPTION

Figure 1:
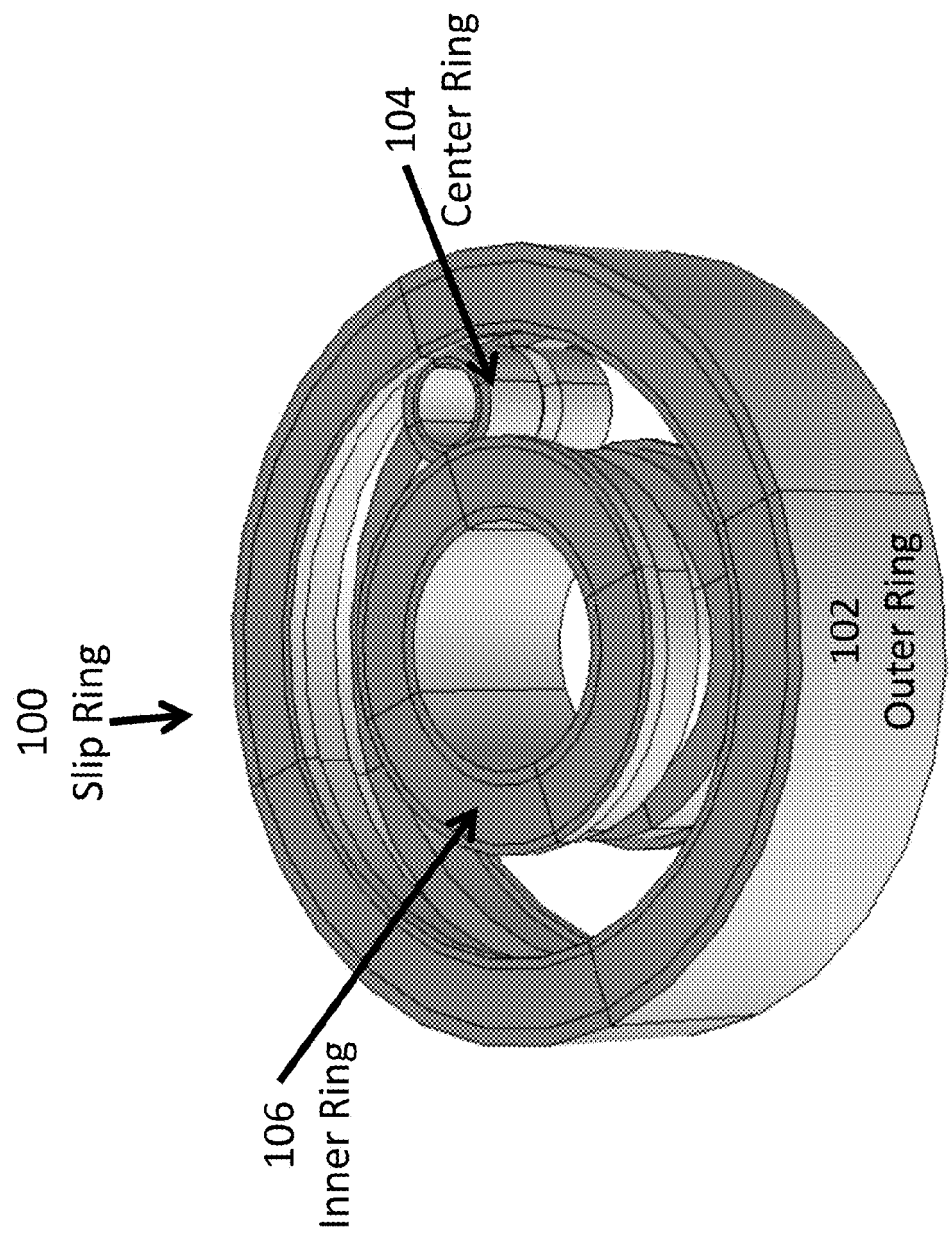
FIG. 1 is a diagram of a rolling slip structure providing mechanical and electrical connectivity between the rings.

Some of the aspects and embodiments disclosed herein are directed to an apparatus and processes for providing optical signal propagation through a rolling slip ring assembly. As discussed in more detail below, through the integration of optical wave guiding components into a rolling slip ring structure, improved data communication rates can be achieved as compared to traditional electrical communication mechanisms used in rolling slip rings. In particular, according to some embodiments one or more fiber optic rings can be provided for each of an outer roll ring, a center roll ring, and an inner roll ring so as to provide for optical signal propagation through a rolling slip ring assembly.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Some embodiments disclosed herein implement an optical wave guiding structure using inner, outer, and center rotatable optical waveguides that provides at least one optical communication pathway between an input signal optical waveguide and an output signal optical waveguide of a rolling slip ring assembly. One such embodiment is described below with reference to FIG. 2. According to at least one embodiment, three optical waveguide rings are aligned such that the three optical waveguide rings all lay in a common plane that is perpendicular to the axis of rotation for each optical waveguide ring. In some embodiments, the optical waveguide rings are optical fibers having a circular cross section. In other embodiments, the optical waveguide rings can have a rectangular cross section or other shapes. In further embodiments, optical wave guiding may be accomplished by surface plasmon modal propagation along metal dielectric interfaces. According to at least some embodiments, the radii of the optical waveguide rings within the slip ring structure will be small enough to provide coupling between optical waveguide rings of the rolling slip ring assembly, before energy has been radiated or absorbed by the metal. In the embodiment illustrated in FIG. 2, an outer optical fiber ring 202 is concentric with an inner optical fiber ring 206, with the two optical fiber rings sharing a common axis of rotation 214. A center optical fiber ring 204 is located between the outer optical fiber ring 202 and the inner optical fiber ring 206, in an appropriate manner and at an appropriate distance, such that an optical signal mode or optical signal modes can be supported by each of the optical fiber rings to couple optical signals between the inner and outer optical fiber rings.

The effect of modal optical signal coupling between mode matched optical waveguides is depicted in FIG. 3A, in a multilayer planar waveguide structure 302 having two layers 304 and 306 having a high refractive index that are surrounded by lower refractive index material layers 308, 310, and 312. Each of the two layers having a high refractive index can be treated as separate, but coupled optical waveguides. When energy is launched into a primary mode distribution 314 of the upper waveguide, the energy will propagate along the optical axis of the upper waveguide, and will also couple via evanescent wave coupling to the primary mode of the lower waveguide. Referring also to FIG. 3B, after a certain coupling distance $L_0/2$, the energy distribution 314 launched into the upper optical waveguide will be split between the two waveguides, as illustrated by the energy distribution 316. Upon propagating a coupling distance $L_0$, the energy that was initially launched into the upper waveguide's primary mode distribution 314 will then be present in the lower waveguide's primary mode distribution 318. As the propagation distance of the two waveguides increases, the power present in each waveguide will move back and forth between the two waveguides as illustrated by the power magnitude curves 320 and 322 for the upper and lower waveguides. It is appreciated as illustrated in FIG. 3B that by controlling the coupling length between the two waveguides, the energy launched into a single waveguide such as the upper waveguide can either be completely transferred to the other waveguide such as illustrated by waveguide 324 and mode distributions 314 and 318, or split between the two waveguides as illustrated by waveguide 326 and by mode distribution 316.

Referring again to FIG. 2, according to aspects of some embodiments of the rolling slip ring architecture coupling between the optical fiber rings will be discussed by way of example between an input exterior signal optical fiber 208, the outer optical fiber 202 and the center optical fiber 204. In particular, an optical signal provided on input exterior optical fiber 208 couples into the outer optical fiber ring 202 via evanescent mode coupling between the two optical fibers 202, 208. Upon propagation of an optical signal around the circumferential path of the outer optical fiber ring 202, energy is coupled via evanescent wave coupling to the center optical fiber 204. According to aspects of some embodiments, the center optical fiber ring 204 is configured to both rotate around its own central axis and also rotate around the shared rotational axis 214 of the inner 206 and outer 202 optical fiber rings, so that the location where evanescent wave coupling can occur between the optical fiber rings 202, 204, 206 can be constantly changing, but the coupling length between the optical fiber rings 202, 204, 206 remains constant. It is to be appreciated that the optical signal coupling between the optical fiber rings is a function of the radii of the optical fiber rings (the coupling length of the optical fiber rings), as well as the refractive index properties of the optical fiber cores of the optical fiber rings and any cladding layers on the optical fiber cores, and that the combination of these can be configured to allow for high efficiency optical energy transfer between the optical fiber rings.

Figure 2:
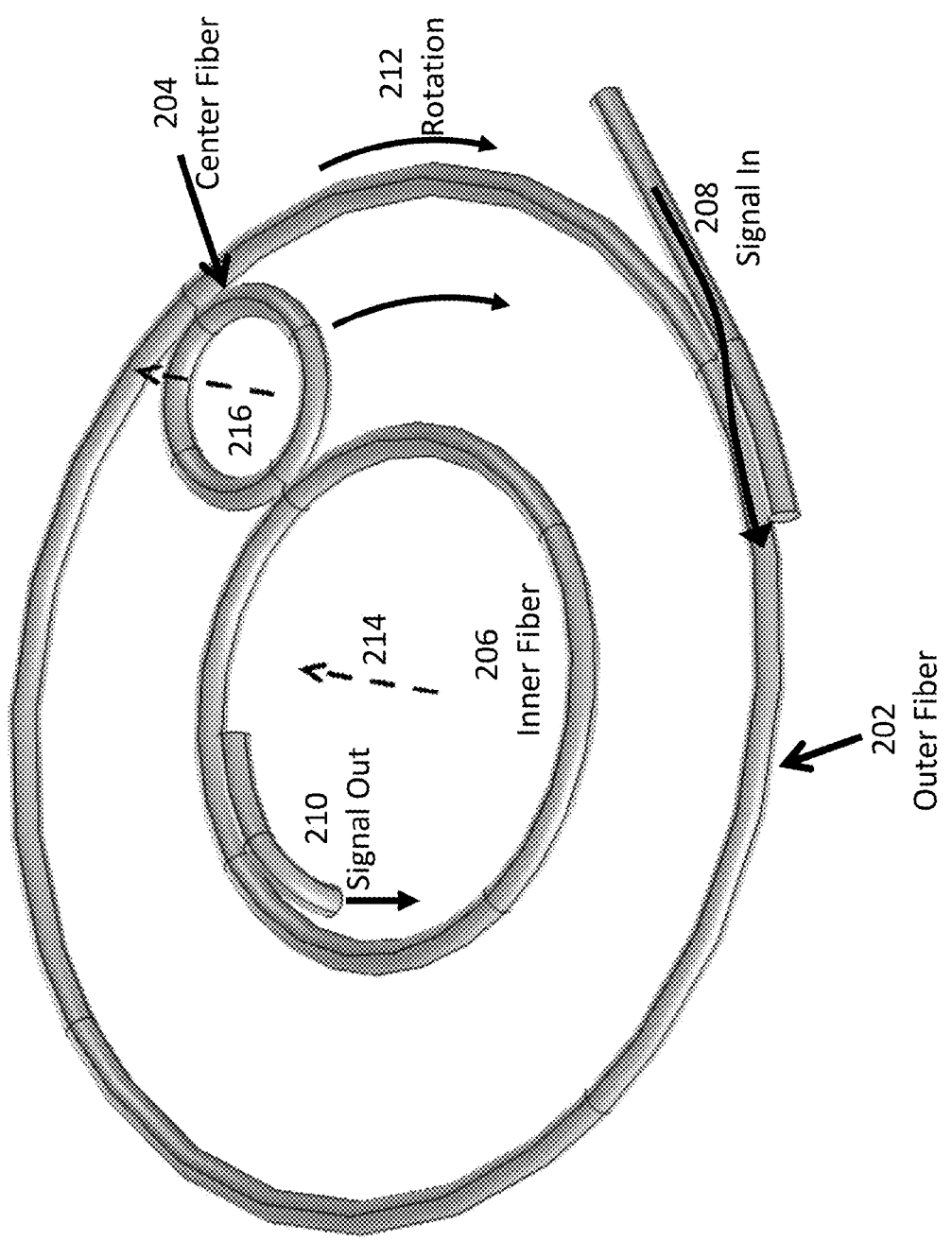
FIG. 2 is a schematic diagram illustrating optical wave guiding components and an optical signal path of a rolling slip ring structure including integrated optics, according to aspects of this disclosure.

It is to be appreciated that with this arrangement, as illustrated for example in FIG. 2, an optical signal can be provided to exterior optical fiber 208 which is located adjacent outer optical fiber 202 for a certain distance so as to transfer an optical signal on the exterior optical fiber to the outer optical fiber 202. The optical signal is coupled to the primary mode of the outer optical fiber 202 and propagates around the outer optical fiber until there is coupling of the optical signal between the outer optical fiber 202 and the center optical fiber 204. The optical signal then propagates around the circumferential path of the center optical fiber ring 204 until energy is coupled via evanescent wave coupling to the inner optical fiber ring 206. The optical signal energy then propagates around the circumferential path of the inner optical fiber ring 206 until the energy couples via evanescent wave coupling to an interior optical fiber 210. According to aspects of some embodiments, the optical signal path can be reversed such that the signal carrying roles of the interior 210 and exterior 208 optical signal fibers are reversed, such that the interior signal fiber 210 becomes the input signal optical fiber and the exterior signal fiber 208 becomes the output signal fiber. According to aspects of some embodiments, both the exterior optical fiber 208 and interior optical fiber 210 can be both the input and the output signal carrying fibers that either simultaneously or non-simultaneously carry counter-propagating signals.

In some embodiments, optical signal fibers may be mounted within grooves etched into the rings of a rolling slip ring assembly to provide an optical fiber rolling ring assembly. In some embodiments, the grooves can be V-shaped grooves that are etched into dielectric layers, such as plastic or glass layers, which form the rings of a rolling slip ring structure. In some embodiments, V-shaped grooves are etched into dielectric layers that are wrapped around electrically conductive rings of a rolling slip ring structure. In some embodiments, the rings of a rolling slip ring structure are made entirely of dielectric materials, the rings are not conductive and are not capable of transmitting electrical power as well as optical signals, and instead the fiber optic rings carry the signals. According to aspects of some embodiments, the rings of a rolling slip ring structure are made of electrically conductive materials that have been wrapped in dielectric material layers, and portions of the conductive rings remain uncovered by dielectric material and allow for electrical power transfer through the rolling slip ring structure that is separate from any optical signal transfer occurring through the optical fibers.

Figure 4A:
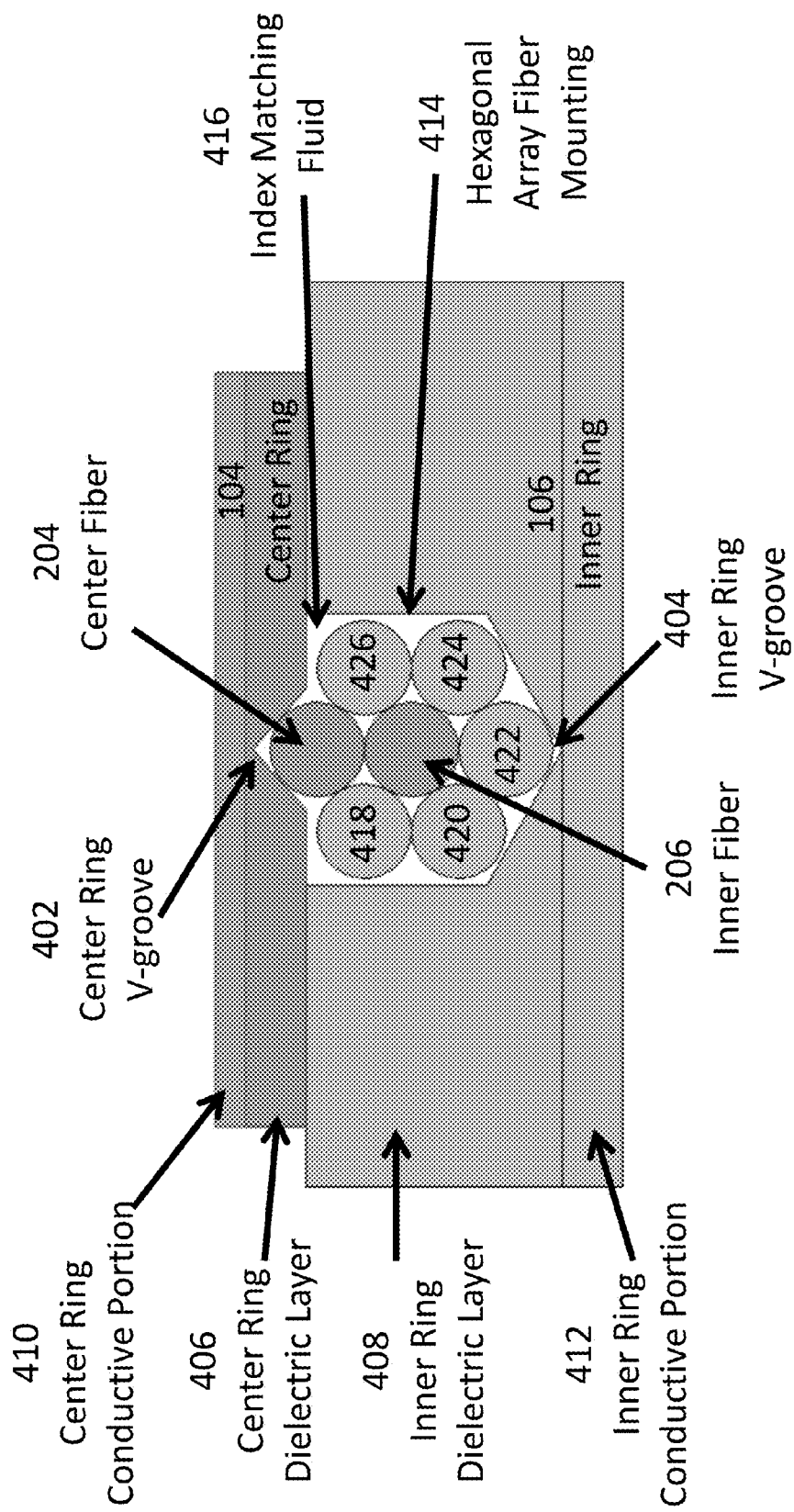
FIG. 4A is a schematic diagram of a hexagonal fiber optic array mounted within V-grooves etched into the rings of a rolling slip ring structure, according to aspects of this disclosure.

A cross-section of one embodiment of an interface between two optical fiber rings is illustrated for example in FIG. 4A. In the illustrated embodiment, V-shaped grooves 402 and 404 are etched into dielectric material layers 406 and 408 that form dielectric wrapping layers around a possibly electrically conductive portion 410 of center ring 104 and possibly electrically conductive portion 412 of inner ring 106. It is to be appreciated that a cross section of the center ring 104 and the outer fiber ring 202 would look identical to that illustrated in FIG. 4A, with components of the inner ring 106 and inner fiber 206 being replaced by the outer ring 102 and outer fiber 202. In the illustrated embodiment, the V-shaped groove 404 within the dielectric layer 408 of the inner optical ring 106 can be etched to a width and to a depth to provide for a hexagonal optical fiber array 414 to be disposed within the V-shaped groove 404. As illustrated in FIG. 4C, according to aspects of some embodiments, the width 428 and 430 and depths 432 and 434 of the etched V-shaped grooves 402 and 436 are such that single optical fibers 204 and 206 are mountable within each V-shaped groove.

In the embodiment illustrated in FIG. 4A, the hexagonal array of fibers 414 can be mounted within the inner ring 106 and the center ring 104 so that six of the optical fibers 206, 418, 420, 422, 424, and 426 of the hexagonal array 414 are wrapped around the inner or outer ring 406 and one fiber 204 is wrapped around the center ring. In such embodiments having a hexagonal array of fibers 414, the inner fiber 206 of the hexagonal array and the center fiber 204 are mode matched fibers that support optical mode coupling between them. In such embodiments, the remaining five fibers 418, 420, 422, 424, 426 of the hexagonal array can be provided with material and optical properties such that they do not participate in optical mode coupling with the center fiber 204 or inner fiber 206. It is appreciated that according to aspects of some embodiments, a similar V-shaped groove may be etched into a dielectric layer surrounding the outer ring 102 with a similar hexagonal array of fibers wrapped around that ring. In such embodiments, optical mode coupling is primarily restricted to be between the center optical fiber 204 and the outer optical fiber 202. The remaining fibers in such a second hexagonal array of fibers would not be optically mode matched to the center optical fiber 204 and the outer optical fiber 202, providing only mechanical support.

In other embodiments, there may be more than six fibers wrapped the inner ring 206 and more than six fibers wrapped around outer ring 202 as part of a signal optical pathway through the rolling slip ring assembly. In such embodiments, the width and depth of the V-shaped grooves may be such as to accommodate a larger number of fibers arranged in a larger hexagonal array. In such cases there might be multiple V-shaped grooves etched into center ring 104, with each V-shaped groove of the center ring 104 containing an optical fiber capable of carrying a separate signal. In such embodiments, the optical signal fiber contained within a particular V-shaped groove of the center ring 104 is aligned with an individual mode-matched optical fiber wrapped around the inner ring 106 and outer ring 102 and embedded within non-mode-matched fibers within hexagonal arrays of fibers. It is appreciated that having such a plurality of optical signal fibers embedded within a hexagonal array of fibers, and with those optical signal carrying fibers contained within non-mode-matched fibers, allows for multiple optical signal channels to for carrying multiple optical signals in parallel.

Figure 4B:
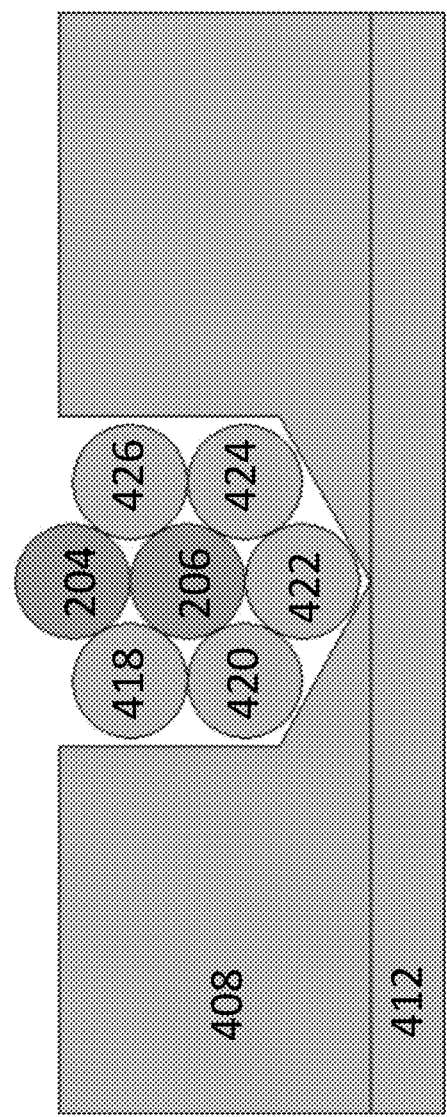
FIG. 4B is a schematic diagram of a hexagonal fiber optic array mounted within a V-groove within a ring of a rolling slip ring structure, according to aspects of this disclosure.
Figure 4C:
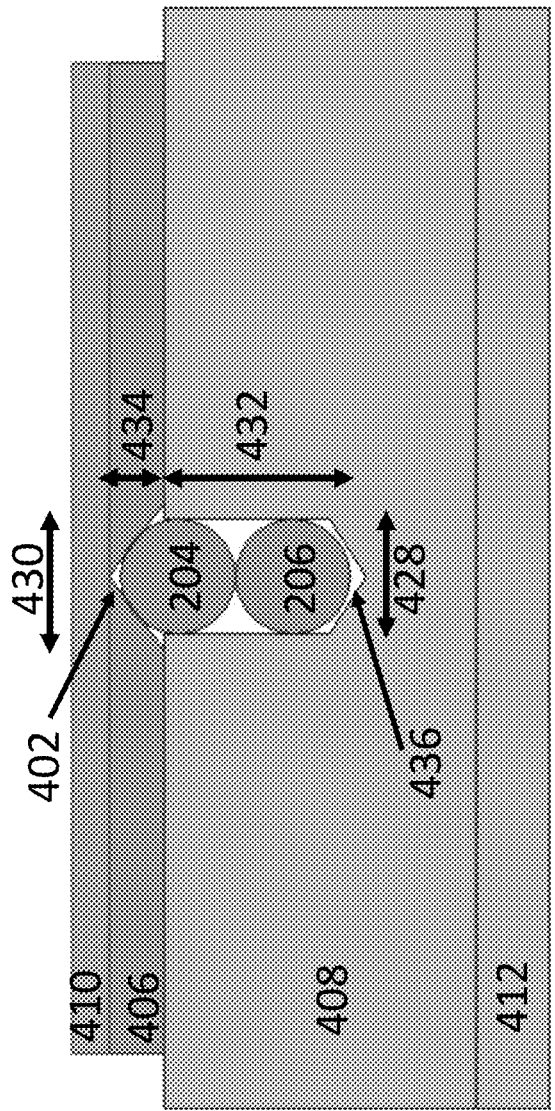
FIG. 4C is a schematic diagram of a fiber optic array mounted within V-grooves etched into the rings of a rolling slip ring structure, according to aspects of this disclosure.
Figure 4D:
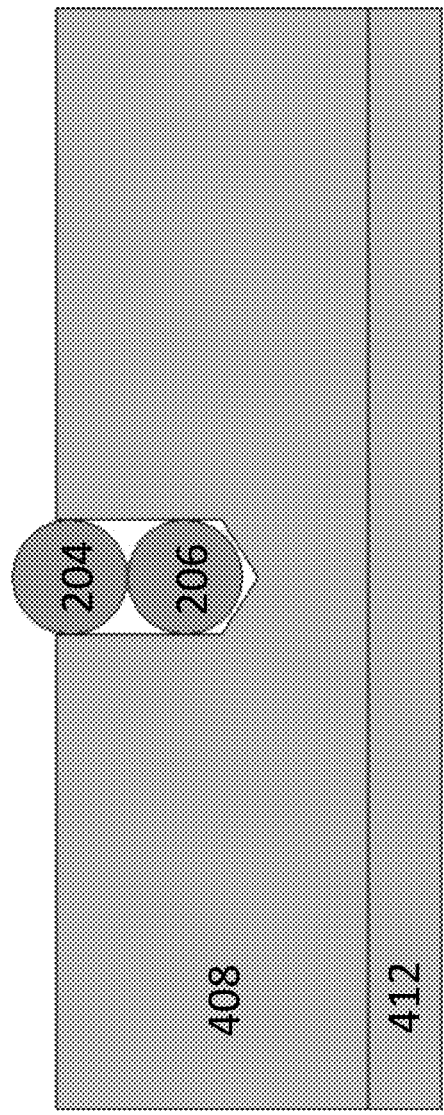
FIG. 4D is a schematic diagram of a fiber optic array mounted within a V-groove etched into the ring of a rolling slip ring structure, according to aspects of this disclosure.

In some embodiments, as shown in FIG. 4B and FIG. 4D, the center fiber 204 is not wrapped around a separate center ring, but instead the center fiber 204 comprises both the center ring and center fiber and thus performs the mechanical functions of a center ring as well as optical coupling and optical guiding functions. In such embodiments, the manufacture of the rolling slip ring assembly is simplified by having only a single component acting as the center ring and center fiber.

According to aspects of some embodiments, the diameter of the center ring 104 is configured to be slightly larger than the separation distance between the inner ring 106 and the outer ring 102 so that the center ring can be configured to have a slight bowing effect that creates a slightly springy elliptical ring. With this arrangement, the eccentricity of this elliptical ring can be varied based on the actual separation of the inner and outer rings so as to maintain good mechanical and optical contact.

According to aspects of some embodiments, any or all of the optical fibers 202, 204 and 206 in the rolling slip ring structure are immersed in a fluid 416 that is index matched to the cladding layers of the optical fibers. It is appreciated that use of index matching fluid 416 enhances the optical coupling between the mode-matched optical fibers through which light is propagating, provides mechanical lubrication that reduces friction between the rolling rings and fibers, and improves product lifetime.

Figure 5:
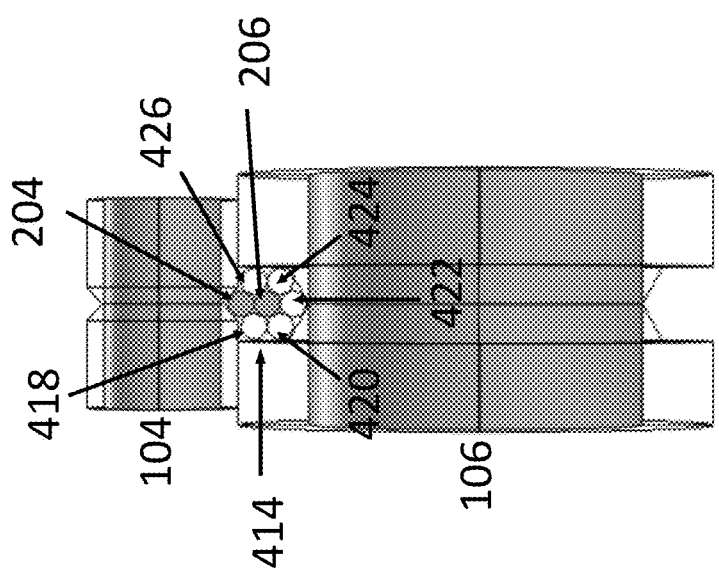
FIG. 5 is schematic diagram of a hexagonal fiber optic array mounted within V-grooves etched into the rings of a rolling slip ring structure, according to aspects of this disclosure.

FIG. 5 illustrates a different view of a portion of the optical fiber rolling ring assembly. Inner ring 106 is etched with a V-shaped groove to accommodate six of the fibers 206, 418, 420, 422, 424, 426 in the hexagonal array of fibers 414 and the center ring 104 is etched with a V-shaped groove to accommodate the center optical fiber 204 as part of the hexagonal array 414 of fibers. As illustrated, the mode matched fibers 204 and 206 are highlighted to show that these fibers are configured to be mode matched so as to carry optical signals relative to the remaining non-mode-matched fibers in the hexagonal array 414.

Figure 6A:
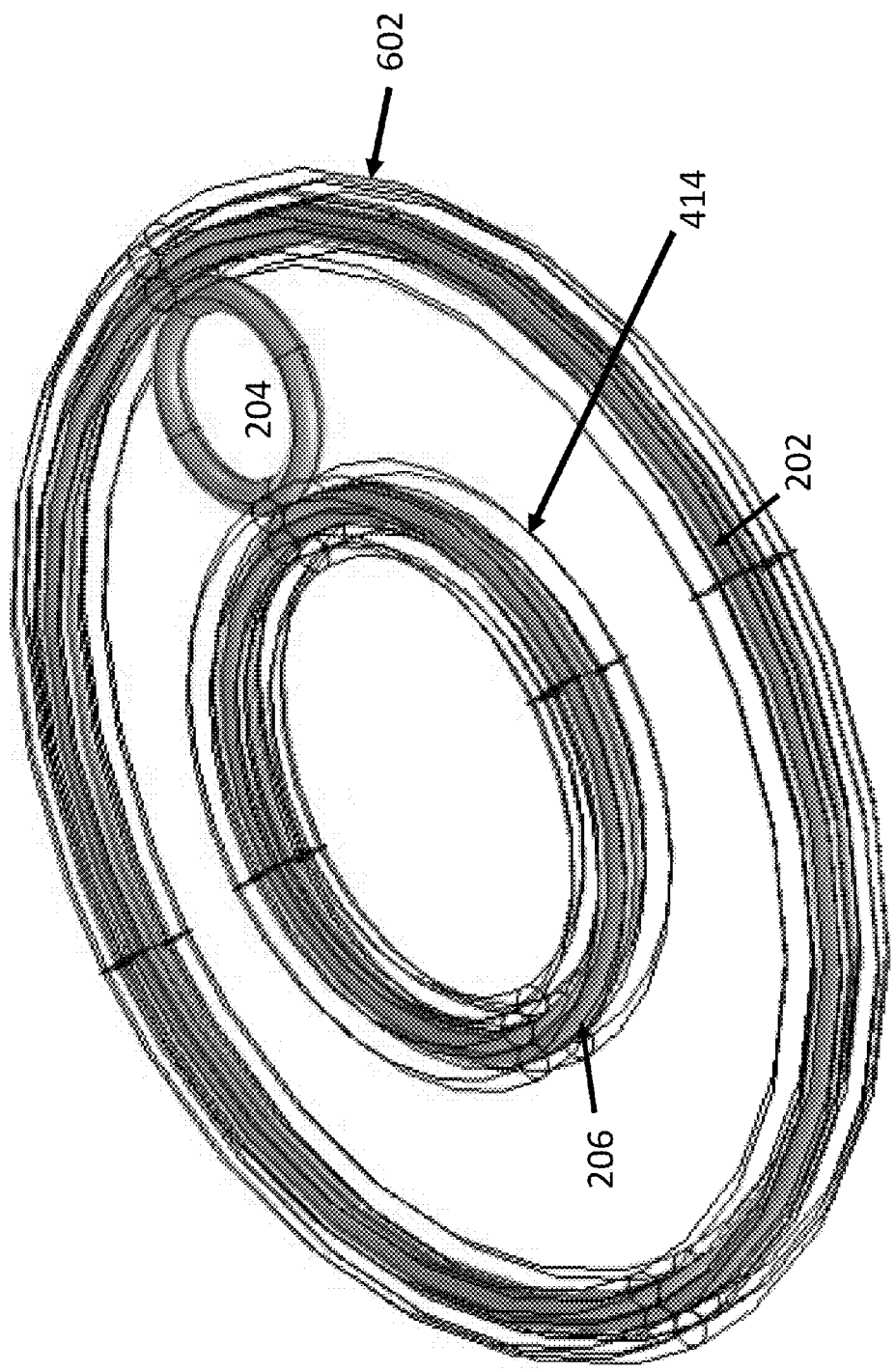
FIG. 6A is a schematic diagram of the fiber rings in a rolling slip ring structure showing inner and outer hexagonal fiber array mountings, according to aspects of this disclosure.

FIG. 6A illustrates a three-dimensional perspective view of an embodiment of a slip ring architecture configured with the outer fiber ring 202 and inner fiber ring 206 configured respectively as part of hexagonal arrays of optical fibers 602 and 414. A center optical fiber 204 is disposed between the outer optical fiber 202 and the inner optical fiber 206, and is part of both hexagonal arrays of optical fibers 414 and 602. In the illustrated embodiment, the mode-matched optical fibers 202, 204, and 206 are highlighted showing their spatial orientation relative to one another and to the other optical fibers. FIG. 6B illustrates still another view of the center ring 104, inner ring 106, and outer ring 102 of the optical rolling ring architecture having the etched V-shaped grooves 402, 404 and 604 in the center 104, inner 106, and outer 102 rings respectively, with the mounted hexagonal array of fibers 414 disposed within the V-shaped groove 402 of the inner ring and the mounted hexagonal array of fibers 602 disposed within the V-shaped groove 604 of the outer ring, and with one of the optical fibers 204 of both hexagonal arrays of fibers 414 and 602 disposed within a V-shaped groove 402 of the center ring 104. FIG. 6B also illustrates mode matched optical fibers 202, 204, and 206 through which optical energy can propagate and can couple between fibers via evanescent waves.

FIG. 6C illustrates a three dimensional perspective of one embodiment of a hexagonal array of fibers that can be incorporated into any of the herein disclosed embodiments of a rolling slip ring architecture. The hexagonal array of fibers is configured such that the input exterior optical fiber 208 couples to an optically mode matched fiber segment 606 of the outermost fiber of hexagonal fiber array 602. As optical energy propagates circumferentially around segment 606 into optically mode matched segment 608, optical energy can couple to outer optical fiber 202. Optically mode matched segments 606 and 608 would normally be a continuous segment of optical fiber that is spliced to a non-guiding partial fiber loop of the outermost fiber in hexagonal fiber array 602. In a similar manner, a segment of optically mode matched optical fiber could be spliced into the innermost fiber ring 422 of the hexagonal array of fibers 414 shown in FIG. 4A.

Figure 6D:
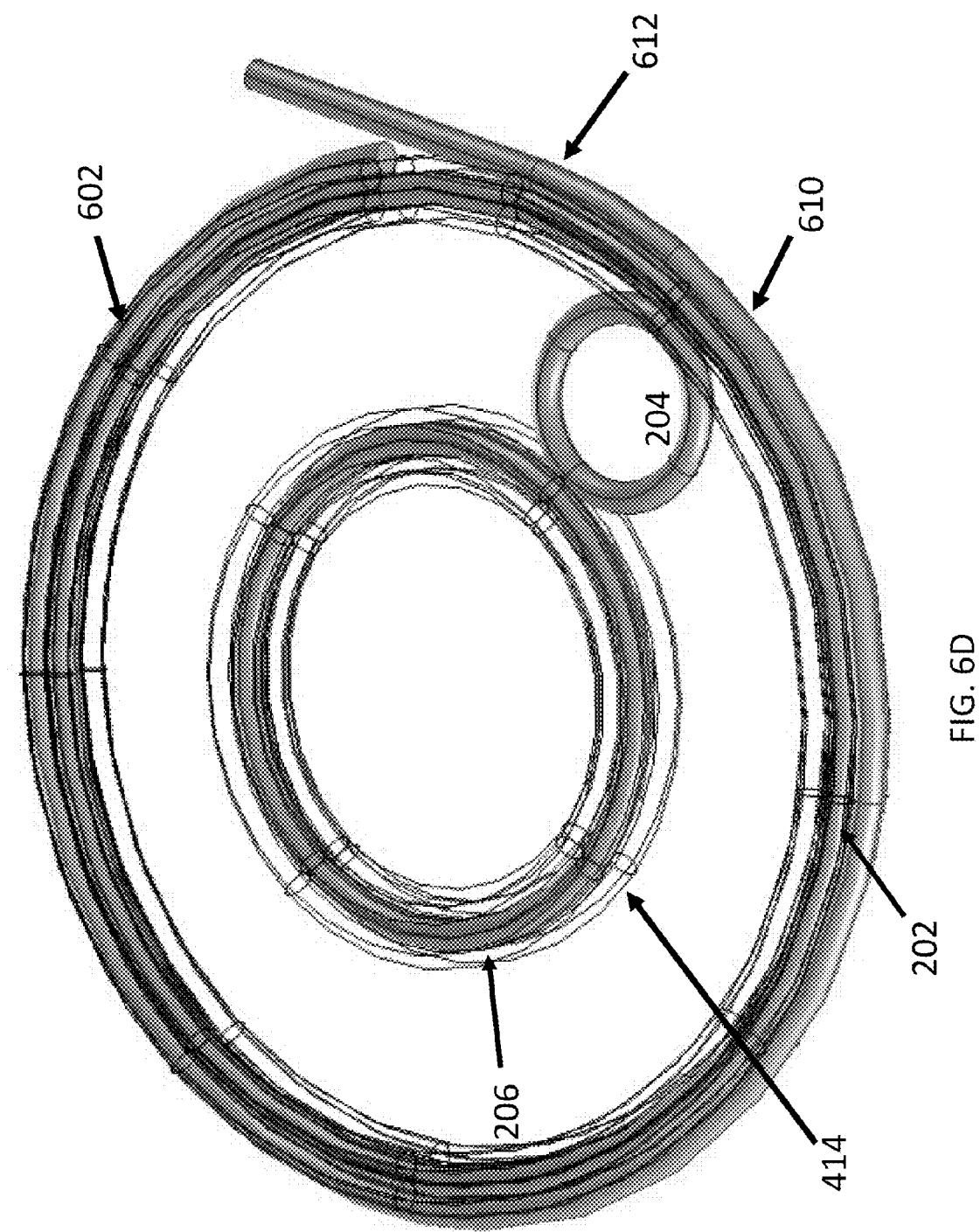
FIG. 6D is a schematic diagram of the fiber rings in a rolling slip ring structure showing inner and outer hexagonal fiber array mountings, as well as an optically mode-matched input segment of optical fiber spliced to a non-mode-matched partial fiber loop within the outer most fiber of the outer hexagonal array, according to aspects of this disclosure.

FIG. 6D illustrates a three dimensional perspective of another embodiment for coupling light into the outer fiber ring 202. In this embodiment, the outer most fiber of the outer hexagonal fiber array 602 is only a partial loop 610. The partial fiber loop 610 is a segment of fiber that is not optically mode matched to outer optical fiber 202. In this embodiment, the exterior input optical fiber 612 is partially wrapped as part of the outer hexagonal fiber array 602 and is spliced to fiber segment 610 at one end. The length of input fiber segment 612 that is wrapped circumferentially as part of outer hexagonal array 602 can be designed to allow for full coupling of optical energy from input fiber segment 612 to outer fiber 202. In a similar approach, a non-mode matched partial fiber segment can be used in place of the inner most fiber ring 422 of the hexagonal fiber array 414 shown in FIG. 4A. In this embodiment, the interior output fiber can be partially wrapped circumferentially as part of interior hexagonal fiber array 414, and can be spliced at one end to a non-mode matched partial fiber segment encompassing the majority of the loop.

It is appreciated that the fiber rings incorporated into a rolling slip ring structure can support whispering gallery mode resonances, whereby the transmission of optical signals through the entire rolling ring structure can be affected if an operational wavelength of the device matches a whispering gallery mode resonance wavelength in one or more of the optical fiber rings 202, 204, or 206. It is appreciated that so as to minimize the effects of whispering gallery mode resonances on the transmission of optical signals through the overall structure, the design of the fiber ring geometry and/or materials used for the optical fiber rings can be such that optical energy is attenuated within the spectral band of operation encompassing the whispering gallery mode resonances of concern. Attenuation of the optical energy within the spectral band encompassing the whispering gallery mode resonances of concern can be done with various structures, such as for example, incorporating optically absorbing materials within the overall structure, as well as mechanically inducing scattering of optical radiation.

Figure 7:
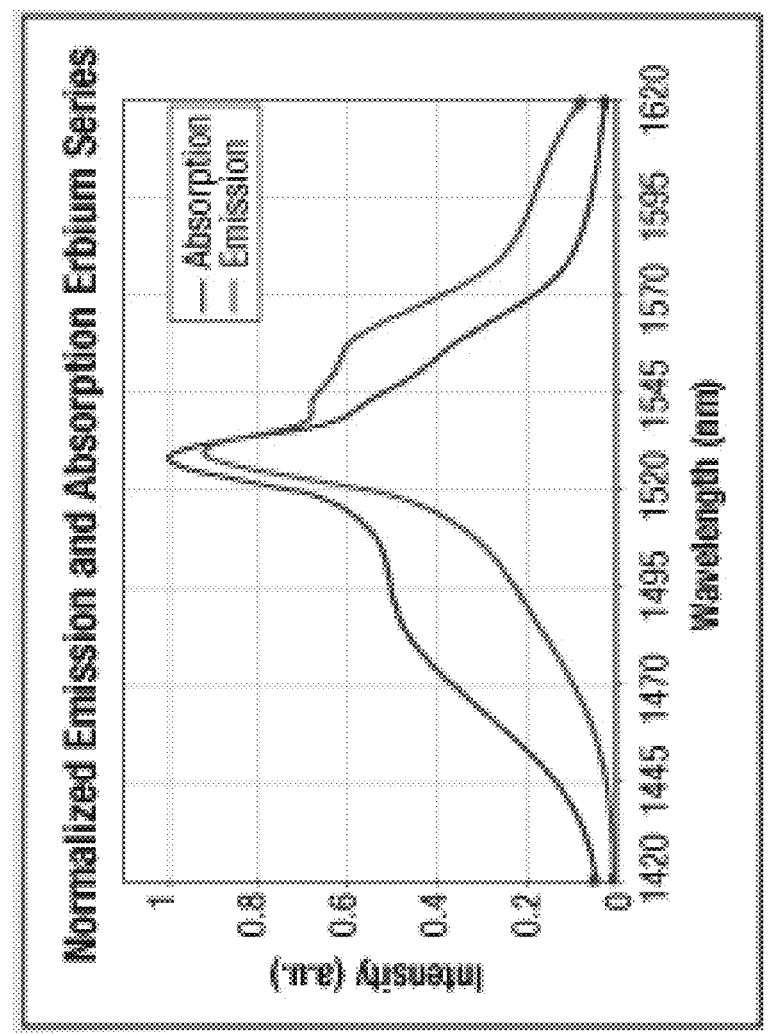
FIG. 7 is plot of the absorption and emission spectra of an erbium doped optical fiber.

In particular, the optical fiber material can be selected so that the optical fiber material absorbs energy at the same wavelength as a whispering gallery resonance mode, so that the absorbing material can counteract the effect of the whispering gallery mode resonance, thereby preventing narrow-band spikes or dips in optical transmission from occurring through the slip ring assembly. According to aspects of some embodiments, optically absorbing materials can be introduced by any of doping the optical waveguide itself with a dopant material, coating the optical fiber with an optically absorbing material layer, or immersing the optical fiber in an optically absorbing fluid material. According to aspects of some embodiments, the optical fibers utilized may include optically absorbing dopants such as rare earth ions like erbium, OH-dopants, and other commonly used fiber dopants. When such dopants are used to absorb optical energy, that energy is often either re-emitted at a separate wavelength that is different from the signal wavelength, or is converted into heat. For example, FIG. 7 shows the absorption and emission spectral response of an erbium doped optical fiber. In particular, FIG. 7 illustrates that when optical energy is absorbed and then re-mitted, for example, by an erbium doped optical fiber, the absorbed energy is re-emitted by the optical fiber at different wavelength than the original signal wavelength, and the re-emitted energy will not be guided by the same optical fiber mode as the initial absorbed signal. The re-emitted light can also be directed into $4\pi$ steradians of solid angle where much of that radiation is not coupled into the same optical mode as the original signal. By re-emitting light into any direction within a sphere, the re-emitted light might have a different wave vector than the light propagating as part of the guided optical mode and is effectively scattered out of the optical system, not contributing to the output optical signal. Thus according to aspects of some embodiments, the saturable absorption properties of the optical fiber materials can be utilized to attenuate optical energy based on the non-linear absorption behavior of the fiber material. With such embodiments, the amount of light propagating in the resonant signal mode is attenuated and the absorption will counteract the presence of a whispering gallery modal resonance.

In some embodiments, optical losses may also or alternatively be induced in a ring waveguide structure by introducing scattering structures into the optical waveguides. Examples of the scattering structures that can be used include etching of the cladding layers of optical fibers to create random scattering locations on the surface of the fiber cladding, introducing volume Bragg grating structures into the fiber core having a grating vector at a non-zero angle relative to the fiber's optical axis, stressing and straining the optical fiber rings to create macro or micro level bends that deform the fibers from their normal toroidal geometries, and introducing a lossy splice when joining the two fiber ends such that fiber's central axis is not perfectly aligned at each end. It is appreciated that each of or any combination of these structures can be introduced to cause optical energy to be scattered from the primary waveguide mode in which optical energy is propagating so that the amount of light propagating in the resonant signal mode is scattered to counteract the presence of a whispering gallery modal resonance.

Figure 8:
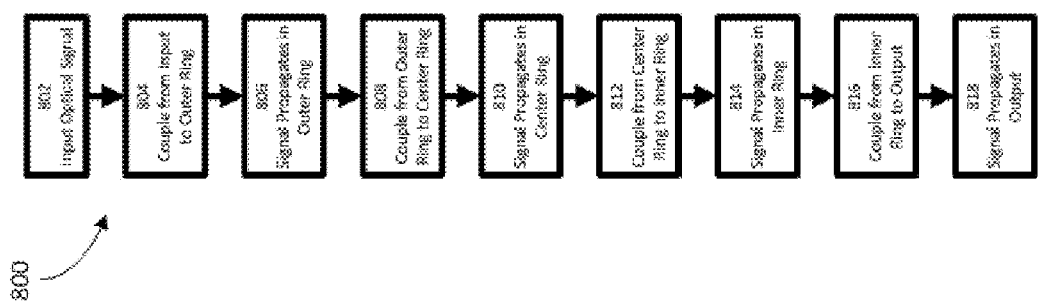
FIG. 8 is a flow diagram illustrating a method for optical signal propagation through a rolling slip ring structure.

FIG. 8 illustrates an embodiment of a method 800 by which optical signals may be coupled between an outer signal fiber and an inner signal fiber through the use of a rolling slip ring structure with integrated optical waveguides. In act 802, an optical signal is provided to an outer optical waveguide and propagated along that outer optical waveguide to the location where it begins to couple optically from the outer optical waveguide into an outer optical waveguide ring. In act 804, the optical signal is coupled from the outer optical waveguide to the outer optical waveguide ring. In act 806, the optical signal within the possibly rotating outer optical ring propagates circumferentially around the outer optical ring to the location where it begins to couple optically to the center optical ring. In act 808, the optical signal within the outer optical ring couples to the center optical waveguide ring. In act 810, the optical signal within the center optical waveguide ring propagates circumferentially around the center optical ring to the location where it begins to couple optically to the inner optical waveguide ring. In act 812, the optical signal within center optical ring couples to the inner optical waveguide ring. In act 814, the optical signal within inner optical ring propagates circumferentially around the inner optical ring to the location where it begins to couple optically to an inner optical waveguide. In act 816, the optical signal within the inner optical ring couples to the inner optical waveguide. In act 818, the optical signal is propagated along the inner optical waveguide. It is to be appreciated that any of the outer optical ring, the center optical ring, and the inner optical ring may or may not be rotating, and that any or all of these rings may be rotating simultaneously or separately.

According to aspects of some embodiments, the optical signal flow can be reversed so that the input optical signal is provided to the slip ring architecture on the inner optical waveguide and output by the slip ring architecture on the outer optical waveguide. According to aspect of some embodiments, the optical signal flow through the fully rotational conductor assembly comprises providing input optical signals to both the outer optical waveguide and the inner optical waveguide and receiving output signals from both the inner optical waveguide and the outer optical waveguide ring as counter propagating optical signals. According to aspects of this embodiment the counter propagating optical signals can be propagated either alternatively or simultaneously.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A fully-rotational conductor assembly, comprising:
    an inner optical signal conductor and an outer optical signal conductor having complementary tracks, at least one of the inner optical signal conductor and the outer optical signal conductor being relatively rotatable about a common axis;
    a center optical signal conductor located between and engaging the complementary tracks, thereby providing optical signal coupling between the inner and outer optical signal conductors;
    an input optical signal conductor optically coupled to the outer optical signal conductor so as to couple optical signals from the input optical signal conductor to the outer optical signal conductor; and
    an output optical signal conductor optically coupled to the inner optical signal conductor so as to couple optical signals from the inner optical signal conductor to the output optical signal conductor.

2. The fully-rotational conductor assembly of claim 1, wherein the inner optical signal conductor comprises an inner fiber optic ring.

3. The fully-rotational conductor assembly of claim 2, wherein the outer optical signal conductor comprises an outer fiber optic ring.

4. The fully-rotational conductor assembly of claim 3, wherein the center optical signal conductor comprises a fiber optic ring.

5. The fully-rotational conductor assembly of claim 4, wherein the center fiber optic ring is disposed in a v-groove of a mounting.

6. The fully rotational conductor assembly of claim 5, wherein the v-groove is etched into a dielectric material layer.

7. The fully-rotational conductor assembly of claim 5, wherein the mounting for the center optical conductor has a circular ring shape.

8. The fully-rotational conductor assembly of claim 5, wherein the mounting of the center optical conductor has an elliptical ring shape.

9. The fully-rotational conductor assembly of claim 3, wherein the outer fiber optic ring is disposed in a v-groove of a mounting.

10. The fully-rotational conductor assembly of claim 9, wherein the v-groove is etched into a dielectric material layer.

11. The fully-rotational conductor assembly of claim 3, wherein the outer fiber optic ring is mounted in a hexagonal array of optically non-mode matched optical fibers.

12. The fully-rotational conductor assembly of claim 11, wherein the fiber array is immersed in a refractive index matching fluid.

13. The fully-rotational conductor assembly of claim 2, wherein the inner fiber optic ring is disposed in a v-groove of a mounting.

14. The fully-rotational conductor assembly of claim 13, wherein the v-groove is etched into a dielectric material layer.

15. The fully-rotational conductor assembly of claim 2, wherein the inner fiber optic ring is disposed in a hexagonal array of optically non-mode matched optical fibers.

16. The fully-rotational conductor assembly of claim 15, wherein the fiber array is immersed in a refractive index matching fluid.

17. The fully-rotational conductor assembly of claim 1, wherein the inner optical signal conductor comprises a dielectric waveguide with rectangular cross-section.

18. The fully-rotational conductor assembly of claim 1, wherein the outer optical signal conductor comprises a dielectric waveguide having a rectangular cross-section.

19. The fully-rotational conductor assembly of claim 18, wherein the center optical signal conductor comprises a dielectric waveguide having a rectangular cross-section.

20. The full-rotational conductor assembly of claim 1, wherein the center optical signal conductor comprises a surface plasmon waveguide.

21. The fully-rotational conductor assembly of claim 1, wherein the center optical conductor provides the optical coupling between the inner optical signal conductor and the outer optical signal conductor via evanescent wave coupling.

22. The fully-rotational conductor assembly of claim 1, wherein the center optical conductor contains an optically absorbing material.

* * * * *